(12) United States Patent
Trung et al.

(10) Patent No.: US 12,025,104 B2
(45) Date of Patent: Jul. 2, 2024

(54) VIBRATION DAMPING OF A STRUCTURE

(71) Applicant: Vestas Wind Systems A/S, Aarhus N. (DK)

(72) Inventors: Giang C. Trung, Aarhus C. (DK); Søren Bøgelund Madsen, Aarhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 96 days.

(21) Appl. No.: 17/607,980

(22) PCT Filed: May 6, 2020

(86) PCT No.: PCT/DK2020/050135
§ 371 (c)(1),
(2) Date: Nov. 1, 2021

(87) PCT Pub. No.: WO2020/224740
PCT Pub. Date: Nov. 12, 2020

(65) Prior Publication Data
US 2022/0275789 A1 Sep. 1, 2022

(30) Foreign Application Priority Data
May 6, 2019 (DK) ............................ PA 2019 70292

(51) Int. Cl.
*F03D 13/00* (2016.01)
*F03D 13/10* (2016.01)
(Continued)

(52) U.S. Cl.
CPC .............. *F03D 80/80* (2016.05); *F03D 13/10* (2016.05); *F03D 13/20* (2016.05); *F05B 2230/60* (2013.01); *F05B 2260/964* (2013.01)

(58) Field of Classification Search
CPC .......... F03D 80/80; F03D 13/10; F03D 13/20; F05B 2230/60; F05B 2260/964
See application file for complete search history.

(56) References Cited

U.S. PATENT DOCUMENTS

| 6,626,642 B1 | 9/2003 | Veldkamp |
| 6,695,588 B1 * | 2/2004 | Nielsen .................. F03D 80/00 416/500 |

(Continued)

FOREIGN PATENT DOCUMENTS

| CN | 202040268 U | 11/2011 |
| DE | 102014000779 A1 | 7/2015 |

(Continued)

OTHER PUBLICATIONS

Alejandro Gomez Gonzalez Ph.D. et al., Blade or Rotor Installation, Prior Art Publishing 2015, No. 7, Apr. 9, 2015 (Apr. 9, 2015), p. 22, XP040665559, D01: http://dx.doi.org/10.4421/PAPDEOTT004176 ISBN: 978-3-945188-10-1 p. 2, paragraph 1-paragraph 4.

(Continued)

*Primary Examiner* — Matthew T Largi
(74) *Attorney, Agent, or Firm* — Wood Herron & Evans LLP

(57) ABSTRACT

The present invention relates to a partly assembled structure in the form of a structure comprising a wind turbine tower, a nacelle arranged thereon and a vibration damper attached to the nacelle for damping vibrations of the combined wind turbine tower and nacelle within a selected frequency range, wherein the vibration damper is operatively connected to a main shaft of the nacelle, or wherein the vibration damper is attached to the nacelle via a nacelle transportation interface. The present invention further relates to a method of constructing a wind turbine and a method for damping Vortex (Continued)

induced vibrations of the combined wind turbine tower and nacelle within the selected frequency range.

19 Claims, 5 Drawing Sheets

(51) Int. Cl.
*F03D 13/20* (2016.01)
*F03D 80/80* (2016.01)

(56) References Cited

U.S. PATENT DOCUMENTS

| | | | | |
|---|---|---|---|---|
| 8,169,098 | B2* | 5/2012 | Scholte-Wassink | F03D 7/042 290/55 |
| 10,161,387 | B2* | 12/2018 | Frydendal | F03D 80/80 |
| 2006/0147306 | A1* | 7/2006 | Zheng | F03D 80/80 416/1 |
| 2008/0145222 | A1* | 6/2008 | Schellings | F03D 80/00 416/31 |
| 2010/0043227 | A1* | 2/2010 | Numajiri | B66C 1/108 29/889 |
| 2011/0148113 | A1* | 6/2011 | Li | F03D 7/0296 290/44 |
| 2013/0189105 | A1* | 7/2013 | Bonnet | F03D 80/00 416/145 |
| 2013/0259684 | A1* | 10/2013 | Hedeen | F03D 13/20 416/244 R |
| 2016/0252079 | A1* | 9/2016 | Ollgaard | F03D 7/0296 52/745.17 |
| 2017/0328058 | A1* | 11/2017 | Dörsam | F03D 80/88 |
| 2017/0328352 | A1 | 11/2017 | Kluemper et al. | |
| 2018/0017125 | A1* | 1/2018 | Amdisen | F03D 13/20 |
| 2020/0263666 | A1* | 8/2020 | Pedersen | F03D 7/0224 |
| 2020/0332548 | A1* | 10/2020 | Mortensen | F16F 7/116 |
| 2020/0355166 | A1* | 11/2020 | Mortensen | E04B 1/98 |
| 2021/0010286 | A1* | 1/2021 | Ma | F16F 7/1028 |
| 2021/0317676 | A1* | 10/2021 | Schneider | F03D 13/10 |
| 2022/0260061 | A1* | 8/2022 | Skjaerbaek | F03D 13/10 |

FOREIGN PATENT DOCUMENTS

| | | |
|---|---|---|
| DE | 102015217068 A1 | 3/2017 |
| EP | 1008747 A2 | 6/2000 |
| EP | 2644886 A2 | 10/2013 |
| EP | 2913553 A2 | 9/2015 |
| EP | 3384154 A1 | 10/2018 |
| WO | 9521327 A1 | 8/1995 |
| WO | 2017092773 A1 | 6/2017 |
| WO | 2018153416 A1 | 8/2018 |

OTHER PUBLICATIONS

Danish Patent and Trademark Office, Search and Examination Report in PA 2019 70292, Sep. 27, 2019.
European Patent Office, International Search Report and Written Opinion in PCT Application No. PCT/DK2020/050135, Aug. 11, 2020.
China National Intellectual Property Administration, office action issued in corresponding Chinese Patent Application No. 202080047944.8, mailed Apr. 29, 2023, with English translation.
Chinese National Intellectual Property Administration, office action issued in corresponding CN Application No. 202080047944.8, dated Sep. 1, 2023, with English translation.
Intellectual Property India, examination report issued in corresponding IN Application No. 202117054752, dated Nov. 20, 2023.
China Intellectual Property Administration, Decision of Rejection issued in corresponding CN Application No. 202080047944.8, with English translation, dated Oct. 11, 2023.

* cited by examiner

VIBRATION DAMPING OF A STRUCTURE

FIELD OF THE INVENTION

The present invention relates to a method for damping vibrations of a structure comprising a wind turbine tower and a nacelle arranged thereon. In particular, the present invention relates to a method for damping such vibrations within a selected frequency range.

BACKGROUND OF THE INVENTION

During the construction phase of wind turbines steady wind may cause a wind turbine tower with a nacelle arranged thereon to vibrate in a fundamental frequency mode due to Vortex induced vibrations. Such Vortex induced vibrations are highly undesirable as they may damage and/or shorten the life time of both the wind turbine tower and/or the nacelle arranged thereon.

There is therefore a need for a damping arrangement and an associated method that can be applied in the time period where construction of the wind turbine can for some reason not be completed.

It may therefore be seen as an object of embodiments of the present invention to provide a method for damping vibrations of a structure comprising a wind turbine tower and a nacelle arranged thereon.

DESCRIPTION OF THE INVENTION

The above-mentioned object is complied with by providing, in a first aspect, a structure comprising a wind turbine tower, a nacelle arranged thereon and a vibration damper attached to the nacelle for damping vibrations of the combined wind turbine tower and nacelle within a selected frequency range, wherein the vibration damper is operatively connected to a main shaft of the nacelle.

Thus, the present invention relates, in a first aspect, to a partly assembled wind turbine in the form of a structure comprising a wind turbine tower and a nacelle arranged thereon. Moreover, a vibration damper is provided for damping undesirable Vortex induced vibrations of this structure as such Vortex induced vibrations may potentially damage and thereby shorten the life time of the structure.

In an embodiment of the invention the vibration damper may be selected among pendulum dampers, friction dampers, magnetic dampers or a combination of the aforementioned types of vibration dampers.

In an embodiment of the invention the vibration damper may be a passive damper. In this embodiment the damper frequency may be essentially constant during use. The damper frequency may be adjusted prior to installation of the vibration damper or shortly after installation.

In an embodiment of the invention the vibration damper may be an actively adjustable passive damper.

The damper frequency may be actively adjusted during operation based on feedback from acceleration sensors located in the vibration damper or associated with the structure. It is herewith achieved that the vibration damper may operate autonomously without user input to adapt to the frequency of a particular structure.

The vibration damper may not be considered a permanent installation in that the vibration damper is only installed in the time period where construction of the wind turbine can for some reason not be completed. Thus, the installation of the vibration damper may be considered a temporary installation.

The vibration damper is, as mentioned above, operatively connected to a main shaft of the nacelle. The term "operatively connected" should be taken to mean that the main shaft carries the weight of the vibration damper—either directly or indirectly. As it will become clear from the following discussions this is advantageous for various reasons, including that the main shaft is already dimensioned to handle heavy loads and that the main shaft is easily accessible in terms of operationally connecting a vibration damper thereto.

In case no hub is secured to the main shaft of the nacelle the vibration damper may be secured directly to the main shaft. The term "directly" should here be taken to mean that the vibration damper may be secured to the main shaft via an adaptor as well as attachment means on the vibration damper. In case a hub is secured to the main shaft, the vibration damper may be secured to the hub.

For example, the vibration damper may be secured to a blade bearing of the hub.

In case of a pitchable blade, the blade bearing may be the pitch bearing.

Moreover, the objective is achieved by providing, in a second aspect, a structure comprising a wind turbine tower and a nacelle arranged thereon and a vibration damper attached to the nacelle for damping vibrations of the combined wind turbine tower and nacelle within a selected frequency range, wherein the vibration damper is attached to the nacelle via a nacelle transportation interface.

The nacelle transportation interface may comprise at least one hard point. The hard point may be configured for securing the nacelle during transportation on various transportation vessels or transportation vehicles. The at least one hard point may be part of the nacelle structure and may thus be able to transfer loads to the nacelle structure. The vibration damper and nacelle transportation interface may comprise co-operating attachment means.

As addressed above a wind turbine tower with a nacelle arranged thereon may vibrate in a fundamental frequency mode due to Vortex induced vibrations. The fundamental frequency mode, and thereby the selected frequency range, may be between 0.05-0.50 Hz, such as between 0.05-0.40 Hz, such as between 0.05-0.30 Hz, such as between 0.05-0.25 Hz.

The vibration damper may comprise a multi-directional vibration damper configured to provide damping along a plurality of damping directions. In case the vibration damper comprises a multi-directional vibration damper the vibration damper may be operated as a stand-alone installation, i.e. no further installations are required.

Alternatively, the vibration damper may comprise a uni-directional vibration damper configured to provide damping along a single damping direction. In case the vibration damper comprises a uni-directional vibration damper an arrangement configured for rotating the nacelle in order to align vibrations of the structure with the single damping direction of the uni-directional vibration damper may further be provided. The arrangement configured for rotating the nacelle may comprise a drive unit and a controller configured to automatically align vibrations of the structure with the single damping direction of the uni-directional vibration damper in real time. The drive unit may comprise a controllable motor, and the controller may execute a suitable control algorithm that automatically aligns the damping direction of the vibration damper with the vibration direction of said wind turbine tower/nacelle structure. The control algorithm may apply various input parameters, such as inputs from accelerometers.

In a third aspect the present invention relates to a method for damping vibrations of a selected frequency range of a structure comprising a wind turbine tower and a nacelle arranged thereon, the method comprising the step of temporary attaching a vibration damper to the nacelle by operatively connecting the vibration damper to a main shaft of the nacelle.

Again, the term "operatively connected" should be taken to mean that the main shaft carries the weight of the vibration damper—either directly or indirectly.

The step of attaching the vibration damper to the nacelle may comprise the step of securing the vibration damper directly to the main shaft. The term "directly" is here to be understood as addressed in connection with the first aspect.

The structure may further comprise a hub secured to the main shaft. In this scenario the step of attaching the vibration damper to the nacelle may comprise the step of securing the vibration damper to the hub.

The vibration damper may, in particular, be secured to a blade bearing of the hub. As already mentioned it is advantageous to secure the vibration damper directly to the main shaft or the hub as they are already dimensioned to handle heavy loads as well as being easily accessible.

The fundamental frequency mode to be dampened, and thereby the selected frequency range, may be between 0.05-0.50 Hz, such as between 0.05-0.40 Hz, such as between 0.05-0.30 Hz, such as between 0.05-0.25 Hz.

In a fourth aspect the present invention relates to a method for damping vibrations of a selected frequency range of a structure comprising a wind turbine tower and a nacelle arranged thereon, the method comprising the step of temporary attaching a vibration damper to the nacelle via a nacelle transportation interface.

As discussed in relation to the second aspect, the nacelle transportation interface may comprise at least one hard point. The at least one hard point may be configured for securing the nacelle during transportation to various transportation vessels or transportation vehicles. The at least one hard point may be part of the nacelle structure and may thus be able to transfer loads to the nacelle structure. The vibration damper and nacelle transportation interface comprise co-operating attachment means.

The vibration damper may comprise a multi-directional vibration damper configured to provide damping along a plurality of damping directions, or the vibration damper may comprise a uni-directional vibration damper configured to provide damping along a single damping direction.

In case the vibration damper comprises a uni-directional vibration damper the method may further comprise the step of rotating the nacelle in order to align vibrations of the structure with the single damping direction of the uni-directional vibration damper. The step of rotating the nacelle in order to align vibrations of the structure with the single damping direction of the uni-directional vibration damper may be performed automatically and in real time. A suitable control algorithm for performing this alignment may apply various input parameters, such as inputs from accelerometers.

In a fifth aspect the present invention relates to a method of constructing a wind turbine comprising a wind turbine tower and a nacelle arranged thereon. The nacelle comprising a main shaft, a hub secured to the main shaft, and a set of rotor blades secured to the hub. The method comprising the steps of partly assembling the wind turbine including the wind turbine tower and the nacelle arranged thereon and the main shaft to the nacelle, installing a vibration damper on the nacelle, in time periods where construction of the wind turbine can for some reason not be completed, removing the vibration damper, and completing construction of the wind turbine.

In an embodiment the vibration damper is temporary secured to either the hub, or to the main shaft of the nacelle, or a nacelle transportation interface.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be explained in further details with reference to the accompanying figures, wherein.

Figure 1:
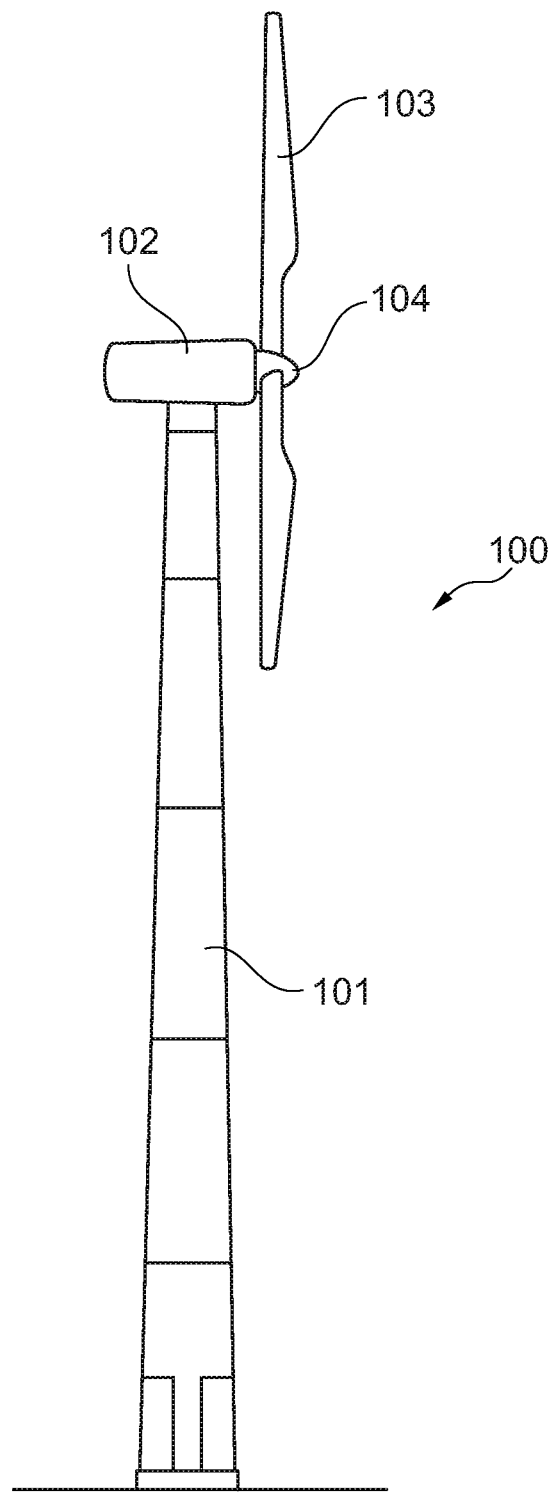
FIG. 1 shows an assembled wind turbine.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In a general aspect the present invention relates to a method for damping Vortex induced vibrations of a structure comprising a wind turbine tower and a nacelle arranged thereon. More particularly, a method for damping Vortex induced vibrations of such a structure within a selected frequency range is provided. The selected frequency range includes at least a fundamental frequency mode of the structure which typically is in the range 0.05-0.25 Hz.

To counteract the undesired Vortex induced vibrations a vibration damper is attached to the nacelle. The vibration damper may be attached to the nacelle either by operatively connecting the vibration to the nacelle via a main shaft of the nacelle or by attaching the vibration damper to the nacelle via a nacelle transportation interface.

The vibration damper may be operatively connected to the nacelle—either by temporary securing the vibration damper directly to the main shaft, or by temporary securing the vibration damper to a hub, such as to a blade bearing of the hub.

Alternatively, the damper may be temporarily attached to the nacelle via at least one hard point in the nacelle transportation interface through co-operating attachment means.

Referring now to FIG. 1 a wind turbine 100 comprising a wind turbine tower 101 and a nacelle 102 arranged thereon is depicted. Moreover, a set of rotor blades 103 are secured to a hub 104 which is secured to the main shaft (not shown) of the nacelle 102. The main shaft is operatively connected to a power generator (not shown) which converts mechanical energy into electrical energy.

As already addressed steady wind may cause a wind turbine tower with a nacelle arranged thereon to vibrate in a fundamental frequency mode due to Vortex induced vibrations. The fundamental frequency mode is typically in the range 0.05-0.25 Hz. As it will be discussed in further details below the effect of Vortex induced vibrations may be counteracted by temporary installing a vibration damper (possibly in combination with an auto yaw arrangement) in the time period where construction of the wind turbine can for some reason not be completed.

Figure 2:
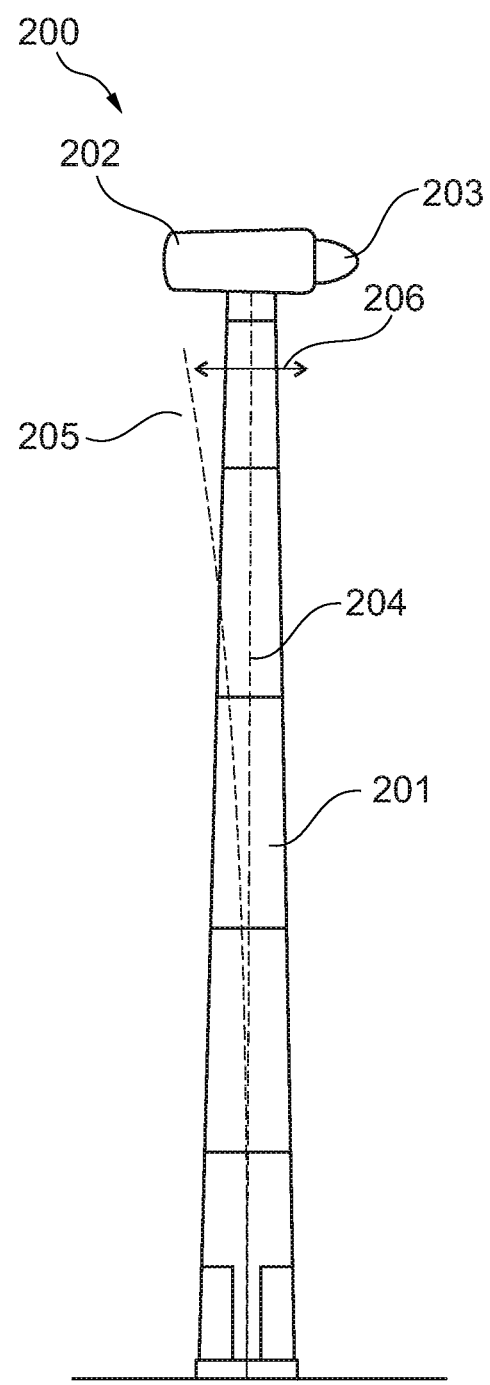
FIG. 2 shows a wind turbine tower and a nacelle arranged thereon.

FIG. 2 shows a partly assembled wind turbine 200 in the form of a structure comprising a wind turbine tower 201 and a nacelle 202 arranged thereon. Moreover, a hub 203 is secured to the main shaft (not shown) of the nacelle 202. The rotor blades have however not yet been secured to the hub 203. As illustrated by the curved line 205 and the arrow 206, and as mentioned above, the structure comprising the wind turbine tower 201 and the nacelle 202 arranged thereon tend to vibrate in a fundamental frequency mode between 0.05 Hz and 0.25 Hz due to Vortex induced vibrations. The Vortex induced vibrations may bring the structure comprising the wind turbine tower 201 and the nacelle 202 away from the base line 204 by a significant distance.

In order to mitigate the effect of Vortex induced vibrations a vibration damper is installed in the time period where construction of the wind turbine can for some reason not be completed. In terms of implementation the general idea underlying the present invention is to temporary secure a vibration damper to either the hub 203, or to the main shaft of the nacelle 202 in case the hub 203 has not yet been secured to the nacelle 202, or a nacelle transportation interface, cf. FIG. 5.

The vibration damper may be secured to the hub either before or after the hub is secured to the main shaft. Typically, the hub is secured to the main shaft after the nacelle has been arranged on top of the wind turbine tower. Similarly, the vibration damper may be secured to the main shaft either before or after the nacelle has been arranged on top of the wind turbine tower.

The vibration damper may be a multi-directional vibration damper being capable of providing damping in multiple directions. Alternatively, the vibration damper may be a uni-directional vibration damper being capable of providing damping in a single direction. The damping mechanism of the vibration damper may rely on a variety of damping mechanisms, including magnetic damping, friction damping and conventional mass/spring systems.

In case the vibration damper is a multi-directional vibration damper the vibration damper may be operated as a stand-alone installation, i.e. no further installations are required. In case the vibration damper is a uni-directional vibration damper an auto yaw arrangement may be applied in order to yaw the nacelle so that the damping axis of the vibration damper automatically becomes aligned with the vibration axis of the structure comprising the wind turbine tower and the nacelle. A suitable control algorithm for automatically aligning the damping axis of the vibration damper with the vibration axis of said wind turbine tower/nacelle structure may be based on a variety of input parameters, such as inputs from accelerometers.

Figure 3:
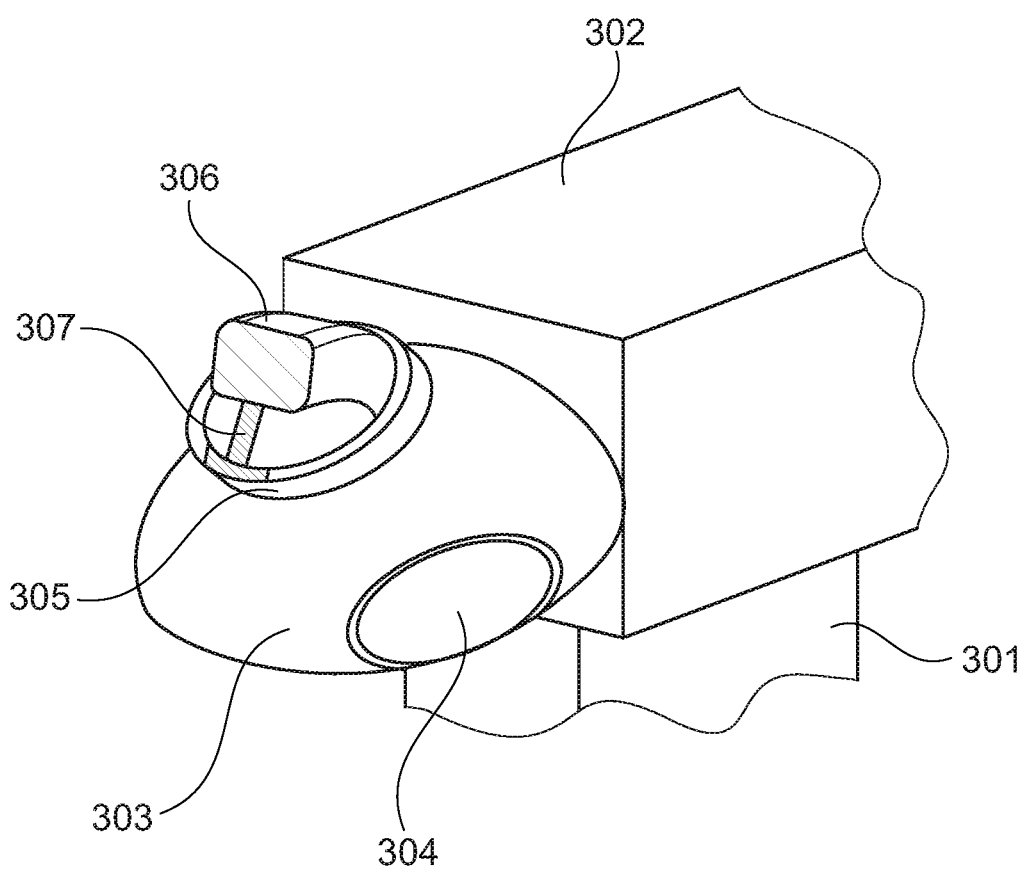
FIG. 3 shows a vibration damper being secured to a blade bearing of a hub.

Referring now to FIG. 3 a vibration damper 306 secured to a hub 303 via an appropriate adaptor 305, 307 is depicted. As seen in FIG. 3 the adaptor 305, 307 is secured to one of the three blade bearings of the hub 303. Each of these blade bearings with associated through-going openings 304 are dimensioned so that they are capable of handling the loads of a rotor blade secured thereto.

The hub 303 is secured to the main shaft (not shown) of the nacelle 302 which is arranged on top of the wind turbine tower 301. As seen in FIG. 3 the hub 303 is arranged at an angular position so that the vibration damper 306 is symmetrically aligned with at least the width of the nacelle 302. The vibration damper 306 may be of the type disclosed above, i.e. a multi-directional vibration damper or a uni-directional vibration damper.

In case the vibration damper 306 is a uni-directional vibration damper an auto yaw arrangement may be applied to yaw the nacelle 302 in order to align the damping axis of the vibration damper 306 with the vibration axis of the wind turbine tower/nacelle structure.

Figure 4:
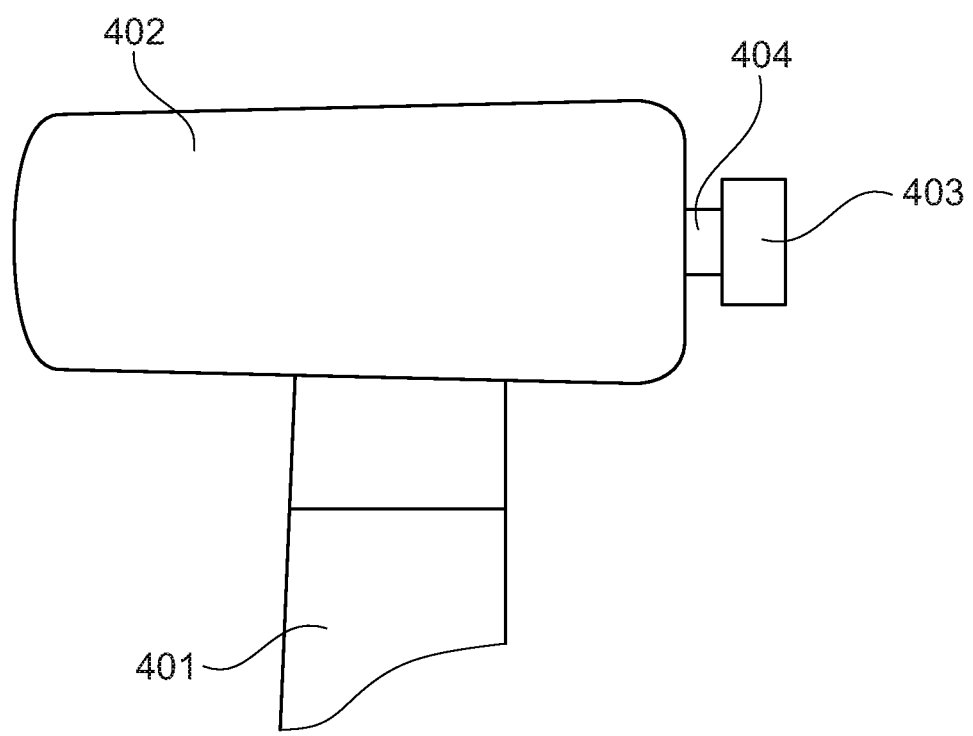
FIG. 4 shows a vibration damper being secured to a main shaft.

Turning now to FIG. 4 a vibration damper 403 secured to a main shaft 404 of a nacelle 402 is depicted. The nacelle 402 is arranged on top of a wind turbine tower 401. Again, the vibration damper 403 may be of the type disclosed above, and in case the vibration damper 403 is a uni-directional vibration damper an auto yaw arrangement may be applied to yaw the nacelle 402 in order to align the damping axis of the vibration damper 403 with the vibration axis of the wind turbine tower/nacelle structure.

Figure 5:
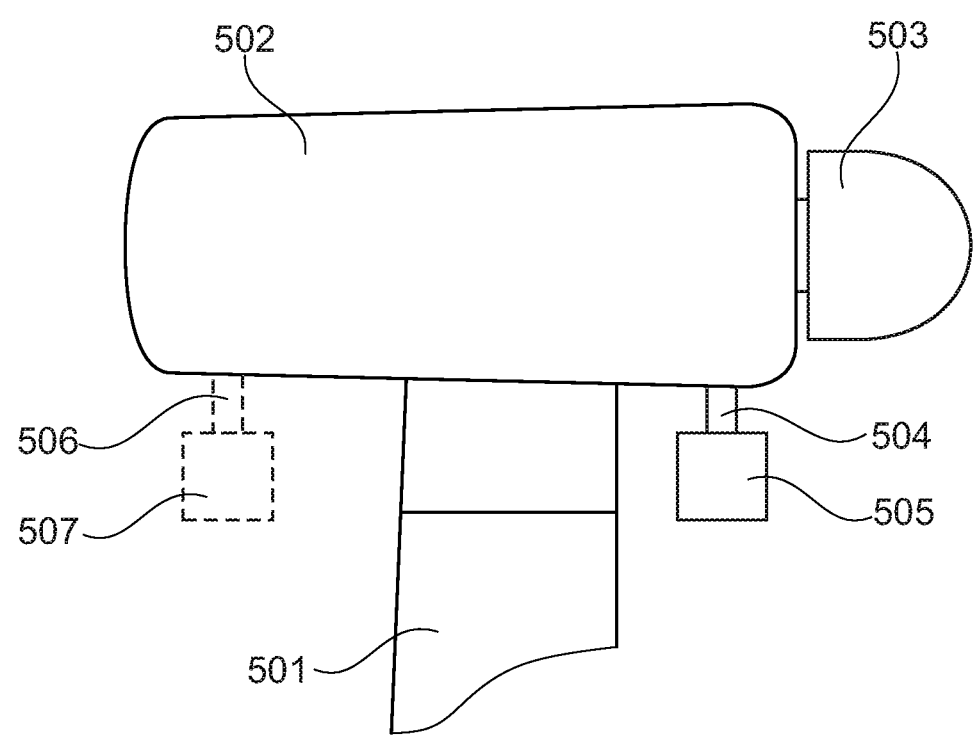
FIG. 5 shows a vibration damper being attached to the nacelle via a nacelle transportation interface.

Referring now to FIG. 5 a vibration damper 505 is secured to the nacelle 502 via a nacelle transportation interface 504. As depicted in FIG. 5 the nacelle 502 is arranged on top of a wind turbine tower 501. A hub 503 may optionally be secured to a main shaft (not shown) of the nacelle 502. The vibration damper 505 may be of the type disclosed above, and in case the vibration damper 505 is a uni-directional vibration damper an auto yaw arrangement may be applied to yaw the nacelle 502 in order to align the damping axis of the vibration damper 505 with the vibration axis of the wind turbine tower/nacelle structure. In FIG. 5 the vibration damper 505 is secured to a nacelle transportation interface 504 arranged near the front end of the nacelle 502. Alternatively, and as depicted by the dotted lines in FIG. 5, a vibration damper 507 may be secured to a nacelle transportation interface 506 arranged near the rear end of the nacelle 502.

The nacelle transportation interfaces 504, 506 may each comprise at least one hard point. The hard point is configured for securing the nacelle 502 during transportation on various transportation vessels or transportation vehicles. The at least one hard point may be part of the nacelle structure and may thus be able to transfer loads to the nacelle structure. The vibration damper 505 and the nacelle transportation interface 504 may comprise co-operating attachment means.

The invention claimed is:
1. A structure, comprising:
a partly assembled wind turbine comprising:
a wind turbine tower,
a nacelle arranged on the wind turbine tower, and
a vibration damper attached to the nacelle for damping vibrations of the combined wind turbine tower and nacelle within a selected frequency range,
wherein the vibration damper is operatively connected to a main shaft of the nacelle and is removed from the main shaft prior to operation of the wind turbine, or wherein the vibration damper is attached to the nacelle via a nacelle transportation interface configured for securing the nacelle during transportation.
2. The structure according to claim 1, wherein the vibration damper is secured directly to the main shaft.

3. The structure according to claim 1, further comprising a hub secured to the main shaft, and wherein the vibration damper is secured to the hub.

4. The structure according to claim 3, wherein the vibration damper is secured to a blade bearing of the hub.

5. The structure according to claim 1, wherein the selected frequency range is between 0.05-0.50 Hz.

6. The structure according to claim 1, wherein the vibration damper comprises a multi-directional vibration damper configured to provide damping along a plurality of damping directions.

7. The structure according to claim 1, wherein the vibration damper comprises a uni-directional vibration damper configured to provide damping along a single damping direction.

8. The structure according to claim 7, further comprising an arrangement configured for rotating the nacelle in order to align vibrations of the structure with the single damping direction of the uni-directional vibration damper.

9. The structure according to claim 8, wherein the arrangement configured for rotating the nacelle comprises a drive unit and a controller configured to automatically align vibrations of the structure with the single damping direction of the uni-directional vibration damper in real time.

10. The structure according to claim 1, wherein the selected frequency range is between 0.05-0.40 Hz.

11. The structure according to claim 1, wherein the selected frequency range is between 0.05-0.30 Hz.

12. The structure according to claim 1, wherein the selected frequency range is between 0.05-0.25 Hz.

13. A method of constructing a wind turbine comprising a wind turbine tower, a nacelle arranged thereon, the nacelle comprising a main shaft, a hub secured to the main shaft, and a set of rotor blades secured to the hub, the method comprising the steps of:
   partly assembling the wind turbine including the wind turbine tower and the nacelle arranged thereon and the main shaft to the nacelle,
   installing a vibration damper on the nacelle, in time periods where construction of the wind turbine can for some reason not be completed,
   removing the vibration damper, and completing construction of the wind turbine,
   wherein the vibration damper is temporarily operatively connected to the main shaft of the nacelle, or temporarily attached to a nacelle transportation interface configured for securing the nacelle during transportation.

14. A method for damping vibrations of a selected frequency range of a structure comprising a wind turbine tower and a nacelle arranged thereon, the method comprising the step of temporary attaching the vibration damper to the nacelle by operatively connecting the vibration damper to a main shaft of the nacelle and removing the vibration damper from the main shaft prior to operation of the wind turbine, or by temporary attaching a vibration damper to the nacelle via a nacelle transportation interface configured for securing the nacelle during transportation.

15. The method according to claim 14, wherein the step of attaching the vibration damper to the nacelle comprises the step of securing the vibration damper directly to the main shaft.

16. The method according to claim 14, wherein the structure further comprises a hub secured to the main shaft, and wherein the step of attaching the vibration damper to the nacelle comprises the step of attaching the vibration damper to the hub.

17. The method according to claim 16, wherein the hub comprises a blade bearing, and wherein the step of attaching the vibration damper to the nacelle comprises the step of attaching the vibration damper to the blade bearing of the hub.

18. The method according to claim 14, wherein the vibration damper comprises a uni-directional vibration damper configured to provide damping along a single damping direction, and wherein the method further comprising the step of rotating the nacelle in order to align vibrations of the structure with the single damping direction of the uni-directional vibration damper.

19. The method according to claim 18, wherein the step of rotating the nacelle in order to align vibrations of the structure with the single damping direction of the uni-directional vibration damper is performed automatically and in real time.

* * * * *